US007282708B2

(12) United States Patent
Kawato

(10) Patent No.: US 7,282,708 B2
(45) Date of Patent: Oct. 16, 2007

(54) METHOD OF SELECTING IONS IN AN ION STORAGE DEVICE

(75) Inventor: Eizo Kawato, Kyoto-fu (JP)

(73) Assignee: Shimadzu Corporation, Kyoto (JP)

( * ) Notice: Subject to any disclaimer, the term of this patent is extended or adjusted under 35 U.S.C. 154(b) by 210 days.

(21) Appl. No.: 11/109,762

(22) Filed: Apr. 20, 2005

(65) Prior Publication Data

US 2005/0236578 A1 Oct. 27, 2005

(30) Foreign Application Priority Data

Apr. 23, 2004 (JP) ............................. 2004-127644

(51) Int. Cl.
*B01D 59/44* (2006.01)
*H01J 49/00* (2006.01)

(52) U.S. Cl. ...................... 250/293; 250/292; 250/281; 250/282; 250/283; 250/297

(58) Field of Classification Search ................ 250/288, 250/281, 292, 282, 293
See application file for complete search history.

(56) References Cited

U.S. PATENT DOCUMENTS 4,761,545 A 8/1988 Marshall et al.
5,134,826 A 8/1992 La Roche et al.
5,696,376 A * 12/1997 Doroshenko et al. ....... 250/292
6,649,911 B2 * 11/2003 Kawato ...................... 250/293
7,064,323 B2 * 6/2006 Yamakoshi et al. ......... 250/293
7,138,624 B2 * 11/2006 Kato .......................... 250/282
2003/0071211 A1 * 4/2003 Kawato ...................... 250/300
2005/0151073 A1 * 7/2005 Kato .......................... 250/287

* cited by examiner

*Primary Examiner*—Robert Kim
*Assistant Examiner*—Johnnie L Smith, II
(74) *Attorney, Agent, or Firm*—Westerman, Hattori, Daniels & Adrian, LLP.

(57) ABSTRACT

The method of the present invention is to select ions having a predetermined mass to charge ratio by applying an ion selecting electric field in an ion storage space of an ion storage device. The method is characterized in that the ion selecting electric field is generated to be proportional to a product of a) a base wave composed of a repetition of a unit wave of a constant amplitude and a predetermined pattern, and b) an amplitude pattern which changes continuously. The amplitude pattern is preferred to increase as time passes in order to gradually increase the intensity of the ion selecting electric field applied to the ion storage space until ions of a desired mass to charge ratio are selected. The unit wave may be generated by the FNF method or by the SWIFT method. Further, it is effective to increase the intensity of the frequency components of the unit wave as the frequency is further from the characteristic frequency of the object ion having a desired mass to charge ratio.

8 Claims, 4 Drawing Sheets

METHOD OF SELECTING IONS IN AN ION STORAGE DEVICE

The present invention relates to a method of selecting object ions quickly at high resolution in an ion storage device.

BACKGROUND OF THE INVENTION

In an analyzer using an ion storage device, such as, for example, a Fourier Transformation Ion Cyclotron Resonance (FTICR) apparatus or an ion trap mass spectrometer, ions are isolated (or selected) as follows. While ions are stored in an ion storage space, an appropriate electric field is applied to the ion storage space, whereby ions having certain mass to charge ratios (m/e) are selectively ejected. Such a method that enables selection of ions while they are stored in the storage space allows the use of an advanced mass analysis called tandem mass spectrometry (MS/MS).

In the MS/MS analysis, ions of various mass to charge ratios are given from an ion generator to an ion storage space. When a certain selecting electric field is applied to the ion storage space, only ions of a specific mass to charge ratio remain in the ion storage space and the other ions are ejected. Then another electric field is applied to the ion storage space to fragment the remaining ions (precursor ions), whereby fragmented ions of the precursor ions are generated in the ion storage space. When an appropriate device operating parameter (or parameters) is changed, the fragmented ions in the ion storage space are ejected toward the ion detector, so that a mass spectrum of the fragmented ions of the precursor ions is obtained.

Since the mass spectrum of the fragmented ions include the structural information of the precursor ion, the MS/MS analysis enables the determination of the structure of the precursor ion which could not be determined solely by measuring its mass to charge ratio (simple MS analysis). For ions having more complex internal structures, repeating selection and fragmentation several times ($MS^n$ analysis) is effective in revealing them.

The ion selecting electric field is normally produced by applying voltage waves of opposite polarities to the opposing electrodes defining the ion storage space without changing the ion storing condition. Especially in an ion trap mass spectrometer, voltage waves of opposite polarities are applied to the two end cap electrodes of the ion trap when ions are selected, while an RF voltage applied to the ring electrode, which is independent of the voltages applied to the two end cap electrodes, keeps storing ions in the ion trap space surrounded by the ring electrode and the two end cap electrodes. Ions stored in the ion storage space oscillate with their characteristic frequencies which correspond to their mass to charge ratios. When an appropriate ion selecting electric field is applied there, the oscillation of the ions is modulated. If the ion selecting electric field includes the component frequency near the resonance frequency of the ions stored in the ion storage space, the ions resonate with the component frequency and their oscillation amplitude becomes larger. In the meantime, such ions collide with the electrodes surrounding the ion storage space or escape from the opening (holes) of the electrodes, so that they are lost from the ion storage space. In an ion trap mass spectrometer, the characteristic frequency of an ion is different in the axial direction and in the radial direction, and, normally, the axial oscillation is used to expel ions in the axial direction.

For the ion selecting wave, a Stored Waveform Inverse Fourier Transform (SWIFT) wave or a Filtered Noise Field (FNF) wave is often used. SWIFT is described in U.S. Pat. No. 4,761,545, and FNF is described in U.S. Pat. No. 5,134,826. A SWIFT wave or a FNF wave is composed of many component sinusoidal waves of various frequencies, but lacks a component at or around a certain frequency ("notch frequency"). The intensity of the ion selecting electric field is determined so that the ions resonating with the component waves are all ejected from the ion storage space. In this case, ions having the resonance frequency corresponding to the notch frequency do not resonate and are not ejected from the ion storage space. Thus only those ions remain in the ion storage space, and selection of ions is achieved.

Actually, even if the frequency of the applied electric field is slightly different from the characteristic frequency of ions, the ions can be excited by the electric field and its amplitude of oscillation increases. Thus a notch is set to have a certain width. But ions having the characteristic frequency at either end of the notch oscillate uncontrollably, so that some of the ions are ejected and some remain in the ion storage space depending on the intensity of the electric field.

Since the characteristic frequency of an ion changes due to the space charge around the ion, it changes due to the number of ions stored in the ion storage space. Thus, when a high-resolution ion selection is aimed for by using a narrow notch width, some part of the object ions may be ejected. In this case, ion selecting waveform having a wide notch is first used to expel ions having characteristic frequencies apart from the object frequency, so that the amount of ions stored in the ion storage space is decreased. Then another ion selecting waveform having a narrow notch is used to select object ions at high resolution. Such a method is described in the U.S. Pat. No. 5,696,376. According to the method, first, low-resolution SWIFT or FNF waveforms having a wide notch is applied to preliminarily select ions. Then another ion selecting waveform having a narrower notch width for attaining a desired resolution is applied to the remaining ions. This assures stable separation efficiency irrespective of the amount of ions initially involved. But it is necessary to take enough cooling time after the preliminary selection to wait for the oscillation of ions to subside.

Conventionally, when ions are intended to be selected at a high resolution, ion selecting waveforms of different notch widths are prepared, and the amplitude of each waveform had to be appropriately set. It required a long time to calculate and generate the waveforms and to appropriately adjust and control their amplitudes. As described above, enough time was necessary for cooling the ions after a preliminary selection.

SUMMARY OF THE INVENTION

In view of the above-described problems, the present invention provides a method of selecting ions in an ion storage device which simplifies the control of the ion selecting waves and their adjustment, and shortens the ion selecting time. According to the present invention, a method of selecting ions having a predetermined mass to charge ratio by applying an ion selecting electric field in an ion storage space of an ion storage device, is characterized in that the ion selecting electric field is generated to be proportional to a product of a base wave, which is composed of a repetition of a unit wave of a constant amplitude and a predetermined pattern, and a continuously changing amplitude pattern.

In order to gradually increase the intensity of the ion selecting electric field applied to the ion storing space until ions of a desired mass to charge ratio are selected, the amplitude pattern is preferred to increase as time passes.

The unit wave may be generated by the FNF method or by the SWIFT method.

It is effective to increase the intensity of the frequency components of the unit wave as the frequency is further from the characteristic frequency of the object ion having a desired mass to charge ratio.

According to the present invention, an ion storage device for selecting ions having a predetermined mass to charge ratio by applying an ion selecting electric field in an ion storage space, includes:

a wave storage for storing a unit wave of a constant amplitude and a predetermined pattern;

a base wave generator for generating a base wave by repeating the unit waves successively with a constant amplitude;

an amplitude wave generator for generating a continuously changing amplitude pattern; and a multiplier for multiplying the base wave and the amplitude pattern.

While the intensity of the ion selecting electric field increases in the ion storage device continuously with time, ions having mass to charge ratios further from the object ratio are gradually ejected from the ion storage space, so that the remaining ions including the object ions experience less influence from the space charge. Thus, ultimately avoiding deviation of the characteristic frequency due to the space charge, object ions having a desired mass to charge ratio are selected at a high resolution.

While applying the ion selecting electric field, in the present invention, there is no need to switch over waves of different notch widths (or different resolutions), but simply the amplitude of the ion selecting electric field is increased, so that the control is simplified. Further, there is no need to take additional time periods in switching different waves, but the ion selecting electric field is applied continuously, so that the ion selection can be performed in a shorter time.

Thus, according to the present invention, the control and adjustment of the ion selecting waves are simplified and the ion selecting time is shortened than before.

DETAILED DESCRIPTION OF A PREFERRED EMBODIMENT

An ion selecting method embodying the present invention is described. The method uses an ion trap for storing ions and adopts an FNF wave as the constant pattern unit wave.

Figure 1:
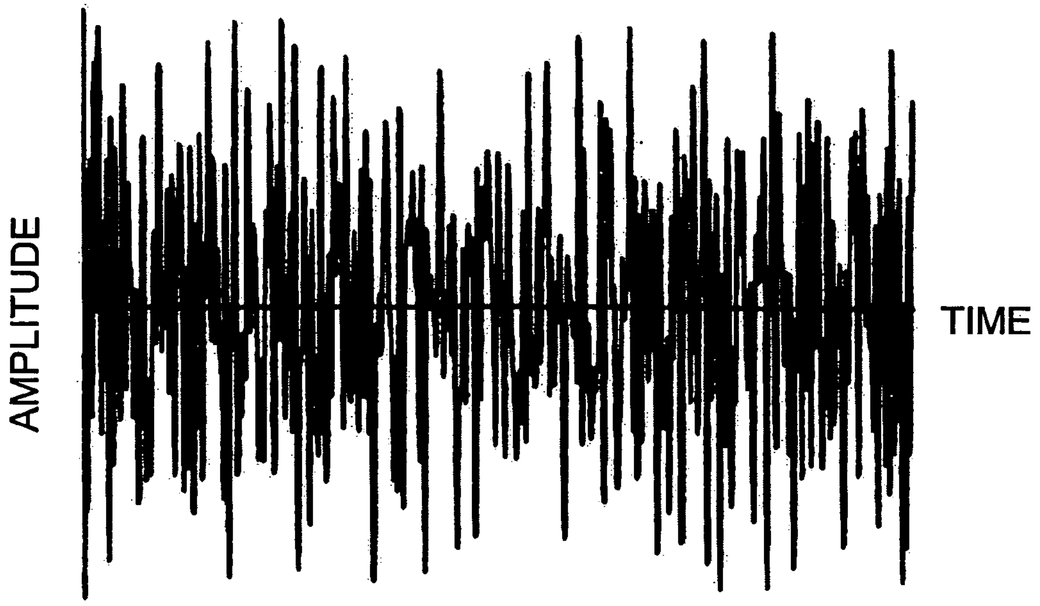
Fig. 1 PRIOR ART
FIG. 1 shows an FNF wave having a constant amplitude and a predetermined pattern.
Figure 2A:
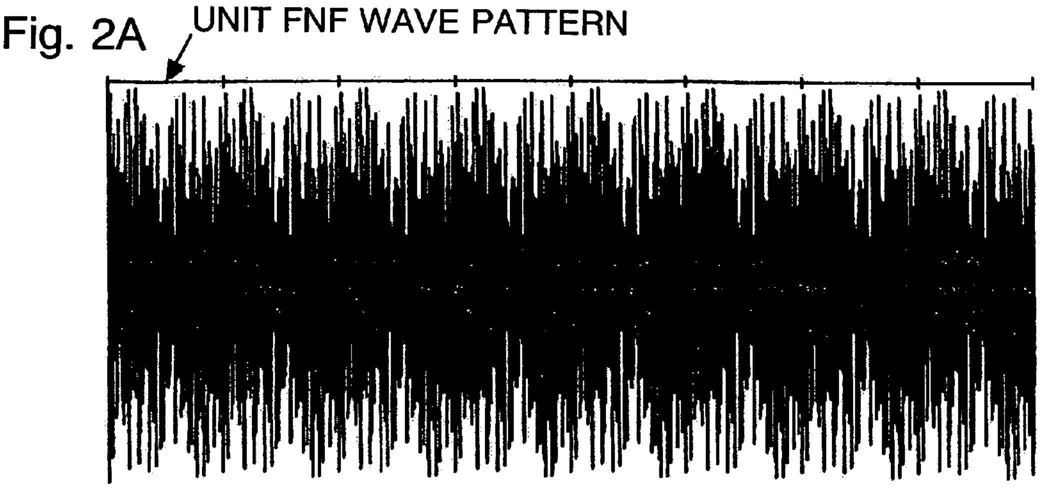
FIG. 2A shows an ion selecting (base) wave composed of repetition of the FNF (unit) wave having a constant amplitude and a predetermined pattern.
Figure 2B:
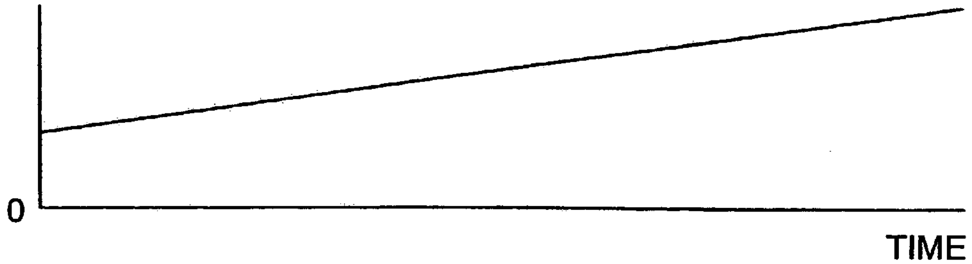
FIG. 2B shows a continuously changing amplitude pattern.

FIG. 1 shows an example of an FNF wave composed of 200 sinusoidal waves of different frequencies. In conventional ion storage devices, the amplitude of the FNF waves or SWIFT waves is controlled to have an appropriate amplitude according to the mass to charge ratio of the ions to be selected. But the amplitude is not changed in a unit wave. In the present invention, the ion selecting wave is generated as follows. First, as shown in FIG. 2A, the unit FNF wave of FIG. 1 is repeated to form a succession base wave. The succession base wave is then multiplied by the continuously changing amplitude pattern as shown in FIG. 2B to generate the wave as shown in FIG. 2C, in which the amplitude changes as time passes.

Figure 2C:
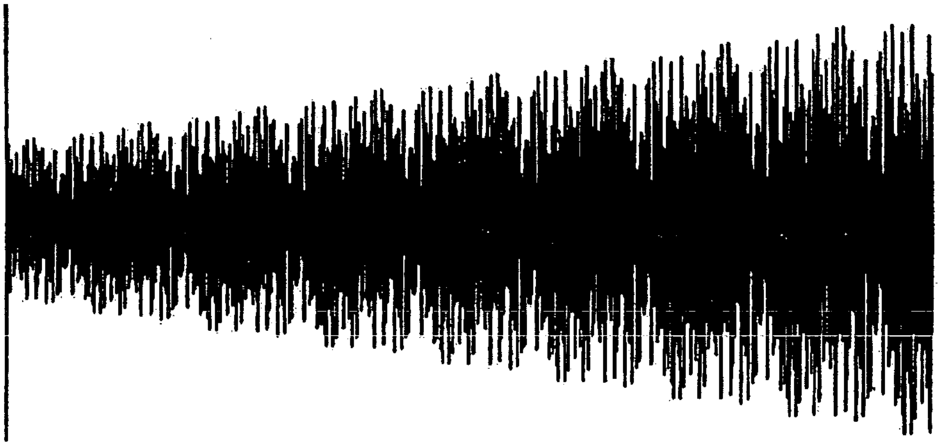
FIG. 2C shows an ion selecting electric field made as the product of the base wave and the amplitude pattern.

In the actual device, the wave as shown in FIG. 2C is not directly generated, but produced as follows. The unit FNF wave pattern of FIG. 1 is stored in a memory beforehand, and it is read out repeatedly, and successively output with a fixed amplitude to form the succession base wave of FIG. 2A. In addition to that, for controlling its amplitude, a continuously changing amplitude pattern as shown in FIG. 2B is generated, and the two pattern signals are multiplied by a signal multiplier to form the wave of FIG. 2C. The resultant wave is used to generate an ion selecting electric field. In the case of an ion trap, the wave of FIG. 2C is amplified and applied to the two end cap electrodes as the ion selecting signal, where the two end cap electrodes are applied with opposite polarities. Owing to the signal, a bipolar electric field is generated between the end cap electrodes, which excites an oscillation of ions in the ion storage space.

Owing to the wave thus prepared, the controller does not need to switch over FNFs of different patterns, adjust optimal amplitude of the voltage, nor control the cooling time and on/off of the FNF patterns. Instead of that, the controller simply starts outputs of unit waves of a constant amplitude, and also starts the continuously changing amplitude pattern.

In the conventional method, when waves of different resolutions are applied one by one to ultimately select ions at a high resolution, respective waves are applied slightly longer than necessary to adequately eliminate unnecessary ions. Further, cooling time is necessary between waves. These render a long selecting time. According to the present invention, since the effective resolution continuously changes, no cooling time is needed, so that an ion selection is performed in a shorter time and with a high resolution.

In the pattern of FIG. 2B, the amplitude increases continuously. In order to select ions with a high resolution, it is sometimes effective to maintain the maximum amplitude for a certain time period after the amplitude attains its maximum. In the succession waves of FIGS. 2A and 2C, the unit FNF wave is repeated eight times, but the number of repetition is determined according to the length of the pattern and the mass to charge ratio of ions. In the pattern of FIG. 2B, the amplitude increases linearly, but it may be curved in order to optimize the ion selectivity. The amplitude may be changed in steps as long as the amplitude is larger at the end than at the beginning. In the case of changing the amplitude in steps, if the amplitude is changed several times within a unit pattern of repetition, the effect is similar to the case when the amplitude is changed continuously.

Figure 3A:
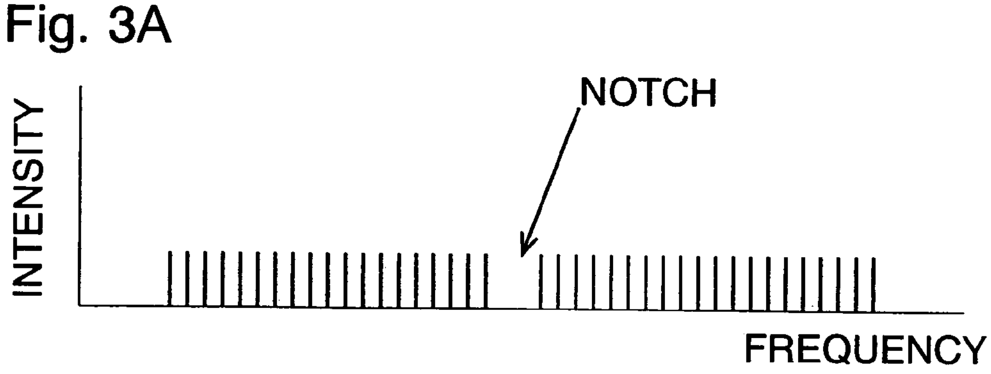
FIG. 3A is a power spectrum of a normally used ion selecting wave having a constant spectrum strength.
Figure 3B:
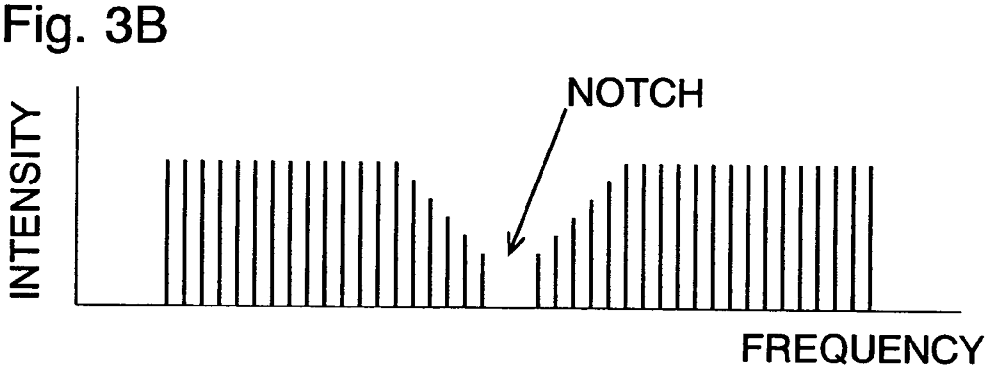
FIG. 3B is a power spectrum of another ion selecting wave having a greater strength as the frequency is further from the notch corresponding to the mass to charge ratio of an object ion.

FIG. 3A is the simplified graph of the power spectrum of the unit FNF wave pattern of FIG. 1, in which the phase information is omitted and the intensities of the frequency components are shown. In the case of the present wave, all the frequency components have the same intensity, but have different phases. In the case of the wave of FIG. 2C, where the amplitude changes continuously, the ion eliminating effect may not be sufficient when the amplitude is small. In such a case, it is effective to increase the intensities of the frequency components remote from the notch, as shown in FIG. 3B. This first eliminates unnecessary ions, and avoids influences of space charge according to such unnecessary ions. On the other hand, the intensities of frequency components near the notch is not increased, which alleviates influences to the ions to be selected and stored in the ion storage space.

Figure 4:
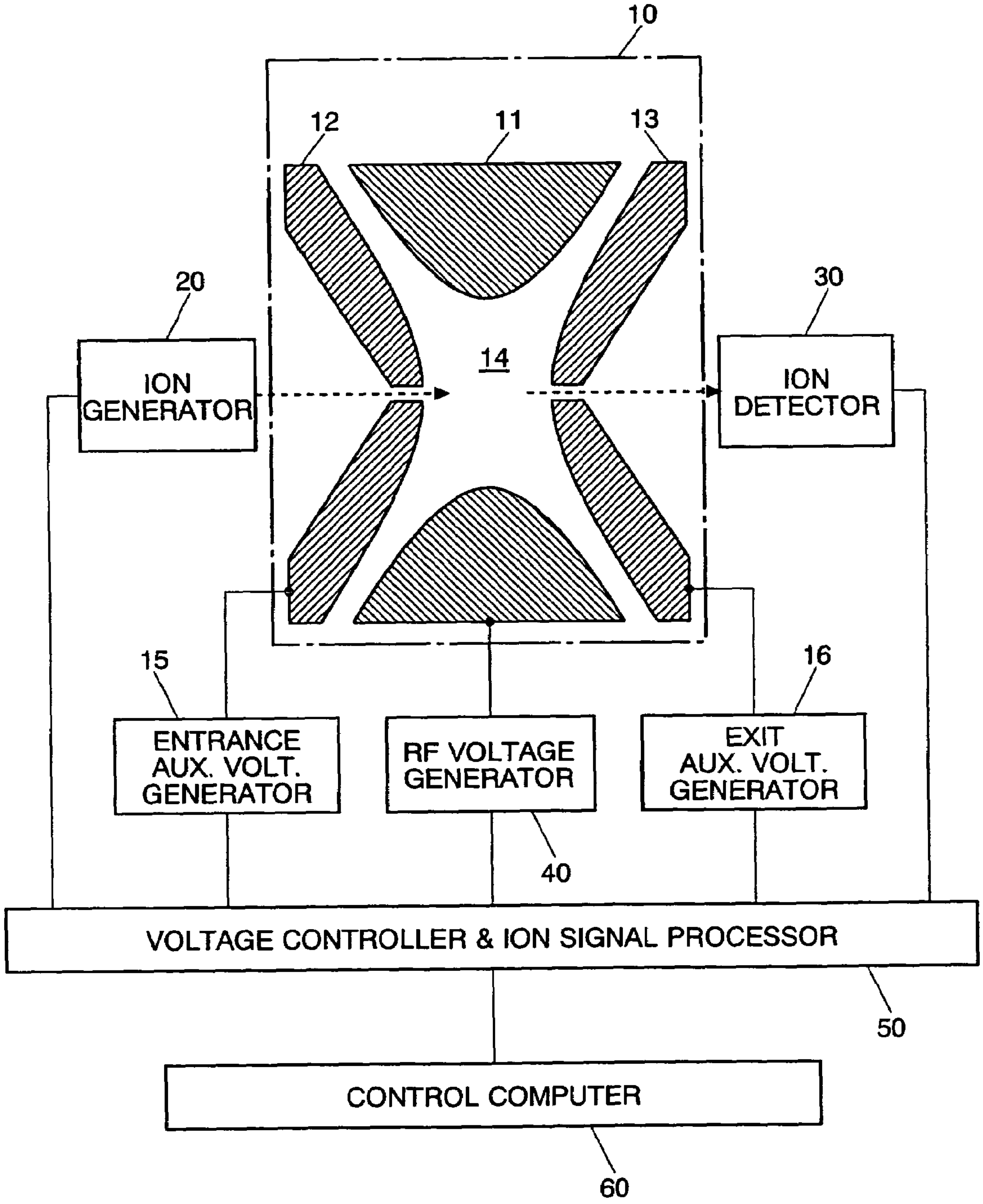
FIG. 4 is a schematic diagram of a mass analyzer embodying the present invention and using an ion trap as an ion storage device.

An ion storage device embodying the present invention is then described. FIG. 4 schematically illustrates the structure of a mass analyzer using an ion trap 10 as the ion storage device. The ion trap 10 is composed of a ring electrode 11 and a pair of end cap electrodes 12, 13 opposing each other with the ring electrode 11 between them. An RF voltage is applied to the ring electrode 11 by an RF voltage generator 40, whereby a quadrupole electric field is generated in the space surrounded by the electrodes 11-13, and an ion storage space 14 is formed there. Auxiliary voltage generators 15 and 16 are respectively connected to the end cap electrodes 12 and 13, And appropriate voltages are applied to the electrodes 12, 13 at appropriate analytical stages.

For example, when ions generated in an ion generator 20 are introduced into the ion trap 10, voltages to decrease the kinetic energy of the ions are applied. When a mass analysis is made by detecting ions with an ion detector 30, appropriate voltages are applied to the end cap electrodes 12, 13 to accelerate ions in the ion storage space 14 and eject them. When ions are selected or fragmented in the ion trap 10, another set of appropriate voltages are applied to generate an electric field for selecting and exciting ions in the ion storage space 14 in addition to the quadrupole electric field for trapping ions produced by the RF voltage The ion generator 20 may be an electron impact (EI) type, an Electrospray Ionization (ESI) type, an Atmospheric Pressure Chemical Ionization (APCI) type, Matrix-Assisted Laser Desorption/Ionization (MALDI) type, or any other type that can produce ions of a sample. The EI type ion generator is suited for samples given by a gas chromatograph, the ESI type and APCI type ion generators are suited for samples given by a liquid chromatograph, and the MALDI type ion generator can ionize a sample placed on a sample plate. The ions thus produced are given to the ion trap either continuously or intermittently as pulses, according to the operation of the ion trap, and are stored there.

Ions that have undergone analysis in the ion trap are sent to the ion detector 30 either continuously or intermittently as pulses, according to the operation of the ion trap. For detecting the ions, the ion detector 30 may be one that directly detects ions using a secondary electron multiplier or a microchannel plate (MCP) together with a conversion dinode while the ion storing condition of the ion trap 10 is scanned, and creates a mass spectrum. The ion detector 30 may be, alternatively, one that performs a mass analysis using a time-of-flight mass spectrometer.

A voltage controller & ion signal processor 50 controls various operations of the ion trap 10, including the operations of controlling the voltages of the RF voltage generator 40 and the auxiliary voltage generators 15, 16, controlling the amount of ions produced by the ion generator 20 and its timing, and measuring and recording the signal of ions detected by the ion detector 30. In the voltage controller & ion signal processor 50, a unit wave having a certain amplitude and a predetermined pattern is stored, and a multiplier for multiplying a base wave composed of a repetition of a unit wave and the continuously changing amplitude pattern are included. A control computer 60 makes settings of the voltage controller & ion signal processor 50, and, receiving the detected ion signal, creates a mass spectrum of the sample, and/or analyzes the structure of the sample.

When an MS/MS analysis is performed, a pair of ion selecting waves having opposite polarities are generated by the auxiliary voltage generators 15, 16, and the waves are applied to the end cap electrodes 12, 13, whereby an ion selecting electric field is generated in the ion storage space 14. After ions having various mass to charge ratios m/e are introduced from the ion generator 20 to the ion storage space 14, ion selecting electric field is applied there. Ions having a predetermined mass to charge ratio m/e remain in the ion storage space 14, but other ions are eliminated. When another predetermined electric field is applied to the ion storage space 14, the remaining ions (precursor ions) are fragmented. The fragmented ions are ejected from the ion storage space 14 and detected by the ion detector 30.

In the ion storage device of the present embodiment, the ion selecting wave as shown in FIG. 2A constituted by a repetition of a unit wave having a certain amplitude and a predetermined pattern, and a continuously changing amplitude pattern as shown FIG. 2B are multiplied. The signal is amplified in the auxiliary voltage generators 15 and 16 respectively, and the amplified voltages are applied to the end cap electrodes 12 and 13. By generating the ion selecting electric field, whose intensity increases with time, in the ion storage space 14 of the ion trap 10, ions having a desired mass to charge ratio or ratio range are selected efficiently and in a short time.

Although only an exemplary embodiment of the present invention has been described in detail above, those skilled in the art will readily appreciate that many modifications are possible without materially departing from the present invention. Accordingly, all such modifications are intended to be included within the scope of the present invention. For example, though the above embodiment is based on an ion trap mass spectrometer, the present invention is applicable to other types of ion storage device.

What is claimed is:

1. A method of selecting ions having a predetermined mass to charge ratio by applying an ion selecting electric field in an ion storage space of an ion storage device, characterized in that the ion selecting electric field is generated to be proportional to a product of a base wave composed of a repetition of a unit wave having a constant amplitude and a predetermined pattern and a continuously changing amplitude pattern.

2. The ion selecting method according to claim 1, wherein the amplitude pattern is a pattern whose amplitude increases as time passes.

3. The ion selecting method according to claim 1, wherein the intensity of frequency components of the unit wave is larger as the frequency is further from the characteristic frequency of the ion having the predetermined mass to charge ratio.

4. The ion selecting method according to claim 1, wherein the unit wave is generated by an FNF method or a SWIFT method.

5. An ion storage device for selecting ions having a predetermined mass to charge ratio by applying an ion selecting electric field in an ion storage space, comprising:

a wave storage for storing a unit wave of a constant amplitude and a predetermined pattern;

a base wave generator for generating a base wave by repeating the unit waves successively with a constant amplitude;

an amplitude pattern generator for generating a continuously changing amplitude pattern; and a multiplier for multiplying the base wave and the amplitude pattern.

6. The ion storage device according to claim 5, wherein the amplitude pattern generator generates an amplitude pattern whose amplitude increases as time passes.

7. The ion storage device according to claim 5, wherein the intensity of frequency components of the unit wave is larger as the frequency is further from the characteristic frequency of the ion having the predetermined mass to charge ratio.

8. The ion storage device according to claim 5, wherein the unit wave is generated by an FNF method or a SWIFT method.

* * * * *